(12) United States Patent
Zufelt (10) Patent No.: US 7,836,360 B2
(45) Date of Patent: Nov. 16, 2010

(54) SYSTEM AND METHOD FOR INTRUSION PREVENTION HIGH AVAILABILITY FAIL OVER

(75) Inventor: Timothy Zufelt, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 11/697,974

(22) Filed: Apr. 9, 2007

(65) Prior Publication Data
US 2008/0250137 A1 Oct. 9, 2008

(51) Int. Cl.
*G06F 11/00* (2006.01)
(52) U.S. Cl. ........................................................ 714/49
(58) Field of Classification Search ................ 714/1–8, 714/15, 16, 19, 20, 37–39, 43, 44, 56
See application file for complete search history.

(56) References Cited

U.S. PATENT DOCUMENTS

| | | | |
|---|---|---|---|
| 5,864,551 A * | 1/1999 | Madonna | 370/353 |
| 6,628,649 B1 * | 9/2003 | Raj et al. | 370/360 |
| 6,765,881 B1 | 7/2004 | Rajakarunanayake | |
| 7,042,890 B2 * | 5/2006 | Maynard | 370/401 |
| 7,174,389 B2 * | 2/2007 | Orava et al. | 709/239 |
| 7,251,745 B2 * | 7/2007 | Koch et al. | 714/11 |
| 2002/0023170 A1 * | 2/2002 | Seaman et al. | 709/235 |
| 2004/0268175 A1 * | 12/2004 | Koch et al. | 714/4 |
| 2005/0050350 A1 | 3/2005 | Cain | |
| 2005/0050351 A1 | 3/2005 | Cain | |
| 2005/0180339 A1 | 8/2005 | Guess et al. | |
| 2005/0193245 A1 * | 9/2005 | Hayden et al. | 714/13 |
| 2005/0240797 A1 * | 10/2005 | Orava et al. | 714/4 |
| 2006/0047809 A1 | 3/2006 | Slattery et al. | |
| 2008/0162981 A1 * | 7/2008 | Jajoo et al. | 714/2 |

OTHER PUBLICATIONS

"Firewall Failover" pre-2006.

* cited by examiner

*Primary Examiner*—Nadeem Iqbal
(74) *Attorney, Agent, or Firm*—Arthur J. Samodovitz; Andrew M. Calderon, Esq.

(57) ABSTRACT

A system and method for intrusion prevention high availability fail over. The system includes a network infrastructure which comprises a first sensor and at least one back-up sensor. The first sensor and the at least one back-up sensor are in line with a network path. The first sensor and the at least one back-up sensor are configured to share connection and session information via a communication link.

22 Claims, 5 Drawing Sheets

SYSTEM AND METHOD FOR INTRUSION PREVENTION HIGH AVAILABILITY FAIL OVER

FIELD OF THE INVENTION

The invention generally relates to a system and method for computer systems and, more particularly, the invention relates to a system and method for intrusion prevention high availability fail over.

BACKGROUND OF THE INVENTION

An intrusion detection system (IDS) detects unwanted manipulations to computer systems. The manipulations may be attacks through the Internet by malicious hackers or script kiddies using automated tools, for example.

The IDS detects malicious network traffic and computer usage that typically cannot be detected by firewalls. More specifically, a firewall looks outwardly for intrusions in order to stop them from happening; whereas, the IDS evaluates a suspected intrusion once it has taken place and signals an alarm. That is, the IDS watches for attacks that originate from within a system. For example, the IDS can detect network attacks against vulnerable services, data driven attacks on applications, host based attacks such unauthorized logins and access to sensitive files, as well as viruses, trojan horses, and worms.

To detect such attacks or other network failures, the IDS is composed of several components including sensors which generate security events. In a network-based IDS, the sensors are located at choke points in the network to be monitored, or at network borders. The sensor captures all network traffic and analyzes the content of individual packets for malicious traffic. In older systems, the IDS was a passive system. In such systems, the IDS sensor detects a potential security breach, logs the information and signals an alert on a console. That is, basically, the sensors only detected traffic as it passed by the sensor, itself.

In a reactive system, also known as an intrusion prevention system (IPS), the IPS responds to the suspicious activity by resetting the connection or blocking the traffic in-line or by reprogramming the firewall to block network traffic from the suspected malicious source. This can happen automatically or at the command of an operator. Thus, in an IPS, once a suspicious activity is detected, the connection may be terminated.

More specifically, the IPS is a computer security device that exercises access control to protect computers from exploitation. The IPS resolves ambiguities in passive network monitoring by placing detection systems in-line. The IPS makes access control decisions based on application content, rather than IP address or ports as traditional firewalls. The IPS may also serve secondarily at the host level to deny potentially malicious activity. Thus, in contrast to IDS, the IPS is designed to sit inline with traffic flows and prevent attacks in real-time. However, the IPS has the potential to cause network outages when it detects a network failure.

Accordingly, there exists a need in the art to overcome the deficiencies and limitations described hereinabove.

SUMMARY OF THE INVENTION

In a first aspect of the invention, a network infrastructure comprises a first sensor and at least one back-up sensor. The first sensor and the at least one back-up sensor are in line with a network path. The first sensor and the at least one back-up sensor are configured to share connection and session information via a communication link.

In another aspect of the invention, a network infrastructure comprises a network path including a plurality of switches and a first sensor and at least a second sensor. The second sensor is a back-up sensor to the first sensor. A communication link between the first sensor and the second sensor. At least the first sensor is configured to transfer connection and session information to the at least second sensor over the communication link in order to ensure a seamless user session if there is a network failure.

In another aspect of the invention, a method comprises transferring connection and session information from a primary sensor to a back-up sensor in a respective network path of a network such that, upon failure of a first network path in-line with the primary sensor, the method establishes a new network path in-line with the back-up sensor while maintaining session information. The transferring of the connection and session information is performed prior to the establishing of the new network path in-line with the back-up sensor.

DETAILED DESCRIPTION OF EMBODIMENTS OF THE INVENTION

The invention generally relates to a system and method for intrusion prevention high availability fail over. More specifically, the system and method of the invention is configured to, upon detection of a network failure, ensure that a conversation or current session is not interrupted (e.g., provide a seamless user session if there is a network failure). This is accomplished by using one or more back-up sensors coupled with an intrusion prevention system (IPS).

In operation, the system includes at least one or more back-up (or standby) sensors configured to receive any OSI/Session data and link state table information from a primary sensor coupled with, for example, an IPS in the network path. The session data table may include, for example, TCP, UDP or ICMP session data, amongst others. It should be appreciated that both the primary sensor and the one or more back-up sensors are coupled to respective IPSs in a network path. In use, upon a network failure (e.g., switch or other device failure), the one or more back-up sensors will receive pertinent any OSI/Session data and link state table information from the primary sensor, and use such information to ensure that a conversation or current session between, for example, a user and a remote server is maintained in a newly established network path. The one or more back-up sensors are, in embodiments, coupled with an IPS in the newly established network path. Similarly, the one or more back-up sensors can also provide the any OSI/Session data and link state table information to the primary sensor, when a network failure is detected.

The primary and one or more back-up sensors are spanning tree protocol aware and may be configured in a passive mode, e.g., not playing an active role in the spanning tree, or an active mode, e.g., an active player in the spanning tree. The sensor(s) will use spanning tree to identify any network changes and then activate the back-up sensor. For example, as the primary and one or more back-up sensors are spanning tree aware, when a switch, link and/or device fails in the network, for whatever reason, the primary sensor copies its connection (e.g., source and destinations) tables to the back-up sensor prior to the spanning tree reconverging into a new path. As such, by the time the spanning tree is reconverged, the back-up sensor already has the any OSI/Session data table and link state table information which, in turn, enables the back-up sensor to maintain the conversation or current session in the newly established network path. Also, the link state table (e.g., on the primary sensor) can be put in passive mode so not to interrupt the current sessions that were moved from the primary sensor to the back-up sensor (and vice versa).

As should be appreciated by those of ordinary skill in the art, in a switched network, whether it be a LAN, Internet, etc., spanning tree protocol (STP) maintains a single path through the network. All switches and spanning tree aware devices elect a root bridge and in this process block all but one path through the network. Thus, in implementation, the STP finds a spanning tree within the network and disables the switches not part of that tree. Also, in STP, as should be appreciated, each switch has a unique identifier (ID) and a configurable priority number, both of which make up Bridge Identification or BID. The switches' BIDs and other STP information are carried in special data frames called bridge protocol data units (BPDUs). BPDUs are exchanged regularly (e.g., every 2 seconds by default) and enable switches to keep track of network changes and activate or disable ports as required.

BPDU is an IEEE 802.1d MAC Bridge Management protocol which is the standard implementation of STP. The BPDU uses the STP algorithm to insure that physical loops in the network topology do not result in logical looping of network traffic. Using one bridge configured as root for reference, the BPDU switches one of two bridges forming a network loop into standby mode, so that only one side of a potential loop passes traffic. By examining frequent 802.1d configuration updates, a bridge in the standby mode can switch automatically into the forward mode if the other bridge forming the loop fails. The structure of a known Configuration BPDU is shown in the below table.

| |
|---|
| Protocol identifier |
| Protocol version identifier |
| BPDU type |
| Flags |
| Root identifier |
| Root path cost |
| Bridge identifier |
| Port identifier |
| Message age |
| Max age |
| Hello time |
| Forward delay |

The following should be appreciated by those of ordinary skill in the art.

Protocol identifier: Identifies the spanning tree algorithm and protocol.

Protocol version identifier: Identifies the protocol version.

BPDU type: Identifies the BPDU type: 0000000=Configuration, 10000000=Topology change notification. For the later type, no further fields are present.

Flags: Bit 8 is the Topology Change Acknowledgement flag and Bit 1 is the Topology Change flag.

Root path cost: Unsigned binary number which is a multiple of arbitrary cost units.

Bridge identifier: Unsigned binary number used for priority designation (lesser number denotes the bridge of the higher priority).

Port identifier: Unsigned binary number used as port priority (lesser number denotes higher priority).

Message age, Max age, Hello time, Forward delay: These are four timer values encoded in two octets. Each represents an unsigned binary number multiplied by a unit of time of $\frac{1}{256}$ of a second. Thus times range from 0 to 256 seconds.

System Environment

Figure 1:
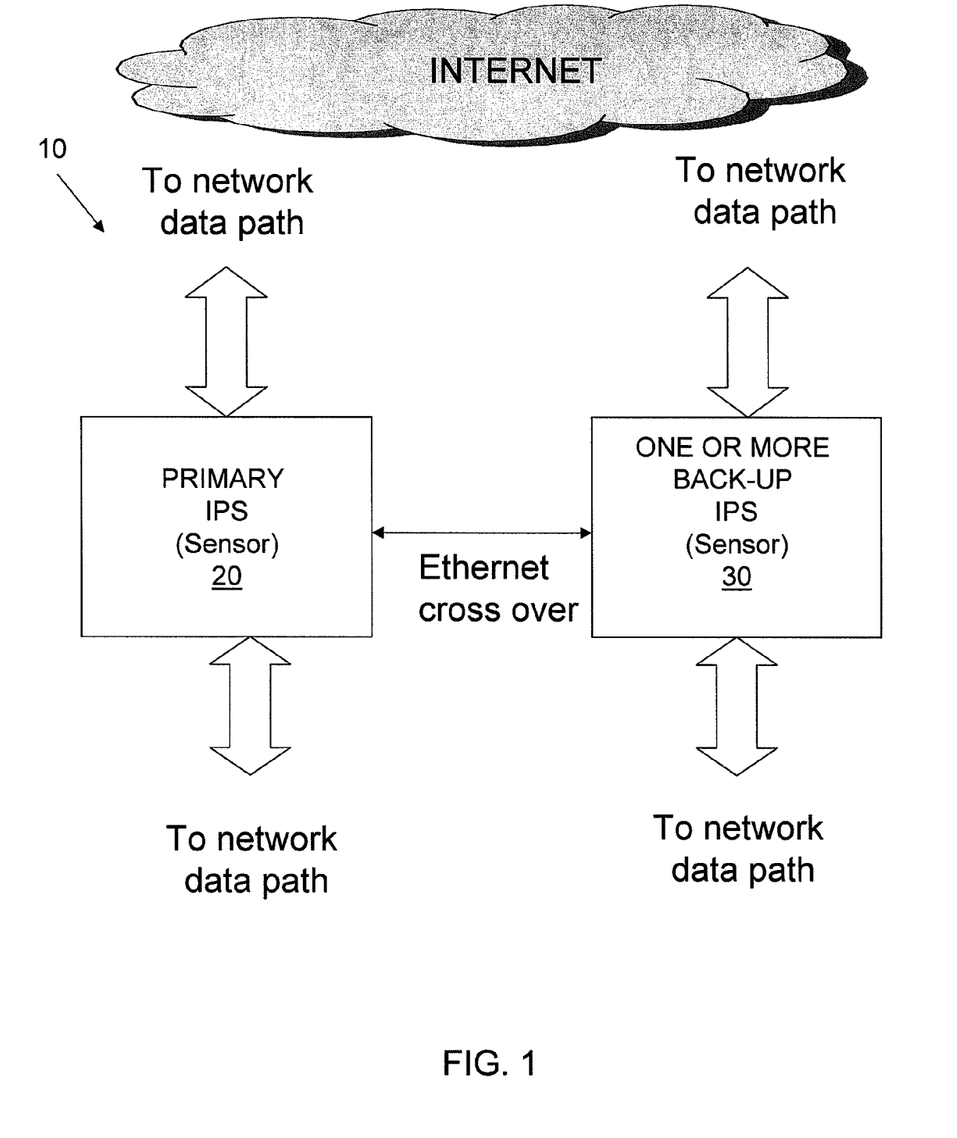
FIG. 1 shows an illustrative environment for implementing the invention.

FIG. 1 shows an illustrative environment 10 for managing the processes in accordance with the invention. The illustrative environment may represent a network using a primary IPS with a coupled sensor (hereinafter referred to as a "primary sensor") 20 and one or more back-up IPSs (hereinafter referred to as "back-up sensors" or "back-up sensor") 30, which are spanning tree protocol aware. The primary sensor 20 and one or more back-up sensors 30 are coupled with respective ISPs, which are connected with an Ethernet cross over, in one embodiment. It should be understood by those of skill in the art that the present invention also contemplates that the primary sensor 20 and one or more back-up sensors 30 can be connected through other communication link (technologies). The primary sensor 20 and one or more back-up sensors 30 are also in-line with the network data path, which may include any number of switches and the Internet.

In embodiments, the Ethernet cross over or other communication link allow the primary sensor 20 to transfer of the session table (e.g., TCP session table, amongst others) and link state table information to the one or more back-up sensors 30, and vice versa. The information may include blocking information, i.e., identifying any IP addresses to block, as well as the current sessions that have already been screened and are considered "legitimate/friendly". This allows the primary sensor 20 and one or more back-up sensors 30 to maintain the conversation or current session when there is a network failure, while maintaining a block on all illegitimate traffic.

By using the Ethernet cross over or other communication link, the primary sensor 20 and one or more back-up sensors 30 can also transfer the session table and link state table information at predetermined time intervals, regardless of a network failure. For example, such information may be transferred every few minutes, or other predetermined time period. In this way, the session table (e.g., TCP session table, amongst others) and link state table information can be synchronized with the primary sensor 20 and one or more back-up sensors 30, in anticipation of a network failure. Accordingly, if a network failure does occurs, the one or more back-up sensors 30 will already have the session table (e.g., TCP session table, amongst others) and link state table information in order to maintain the conversation or current session over a newly established network path. Thus, by implementing the system and method of the invention, the clients of the current session do not have to start over again with a new session and enter data again.

The primary sensor 20 and one or more back-up sensors 30 can be configured in either a passive mode or an active mode. In the passive mode, the primary sensor 20 and one or more back-up sensors 30 are in-line with the network traffic and monitor the BPDUs. In one example, when the switches on either side of the primary sensor 20 stops sending BPDUs, the primary sensor 20 will detect the network failure and send the session table (e.g., TCP session table, amongst others) and its link state table to the back-up sensor 30. In this example, by the time the spanning tree reconverges (e.g., about 50 seconds) and the back-up links become active, the back sensor 30 will already have the current or real time session information and can thus take over in-line network intrusion prevention without loosing any conversations. It should be understood that the invention also contemplates the link state table to the back-up sensor 30 will detect a network failure and send the session table (e.g., TCP session table, amongst others) to the primary sensor 20, when the backup sensor is in-line with the network traffic.

In the active mode, the primary sensor 20 and one or more back-up sensors 30 are line with the network traffic and will be an active player in the spanning tree. For example, the primary sensor 20 and one or more back-up sensors 30 can receive and send out BPDUs and be part of the spanning tree election process. Thus, in embodiments, the primary sensor 20 and one or more back-up sensors 30 can determine a network path based on factors such as, for example, a price charged by ISPs. As such, in the example of pricing, the more back-up sensors 30 may route traffic away from a more expensive ISP, and in this manner manipulate the path of the network traffic. In the active mode, however, the primary sensor 20 and one or more back-up sensors 30 will not be set as a root bridge.

In the active mode, when the switches on either side of the primary sensor 20 stop sending BPDUs, the primary sensor 20 will send its session table (e.g., TCP session table, amongst others) and its link state table to the back-up sensor 30. Alternatively, when the one or more back-up sensors 30 detect that the spanning tree is shifting its links and activating the new links, the back-up sensor 30 can call for the link and session tables (e.g., TCP session table, amongst others) from the primary sensor 20. So, by the time the spanning tree reconverges, the back-up sensor 30 already has all of the current real time session information and can take over in-line network intrusion prevention without loosing any conversations.

Accordingly, in implementation, the primary sensor 20 in the original path can transfer to the back-up sensor 30 in the new path its information identifying any IP addresses to block as well as the current sessions that have already been screened and are "legitimate/friendly". Also, information can be transferred between the IPS in the original path and the IPS in the new path (associated with the primary sensor and back-up sensor, respectively). This information can be about friendly and unfriendly users. With this information, in the newly established path, the IPS can instantly block messages from unfriendly source IP addresses, and also continue the current sessions (so the clients of the current session do not have to start over again with a new session and enter their data again).

Exemplary Implementation of the System of the Invention

Figure 2:
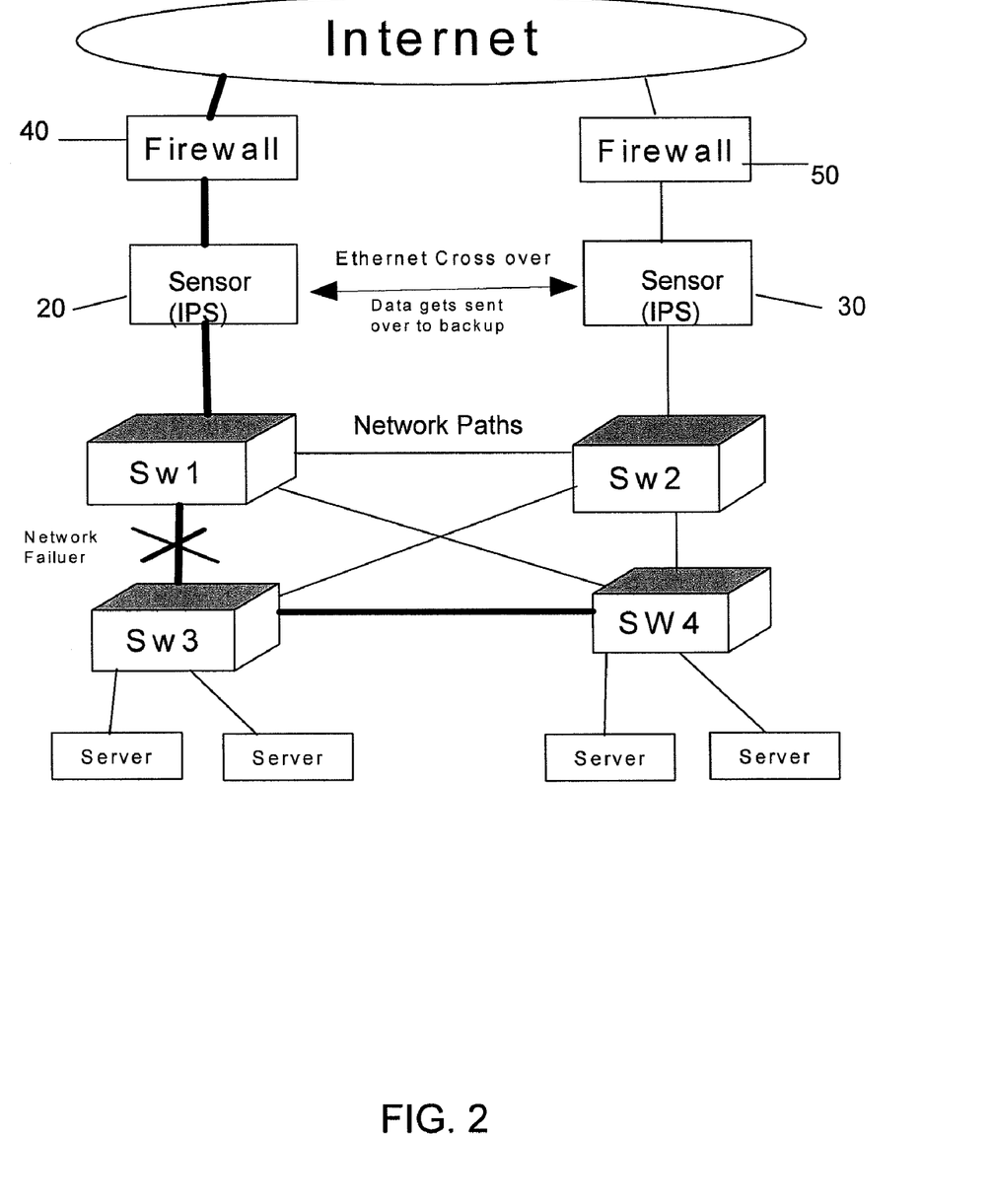
FIG. 2 shows an implementation of the invention, with a number of switches in accordance with the invention.

FIG. 2 shows an implementation of the invention, with a number of switches in accordance with the invention. In FIG. 2, the primary sensor 20 and one or more back-up sensors 30 are also in-line with the network data path. The data network path may include a number of spanning tree protocol aware switches. Sw1, Sw2, Sw3, Sw4, firewalls 40, 50, and one or more servers, for example. As should be appreciated by those of skill in the art, the network data path can include any number of different configurations, which are applicable to the present invention.

The firewalls 40, 50 can each be associated with a different ISP. For this reason, in the active mode, the primary sensor 20 and the back-up sensors 30 may select an appropriate path, via one of the different ISP based on pricing, bandwidth capacity, etc. Additionally, as discussed above, the primary sensor 20 and one or more back-up sensors 30 can also transfer the session table. (e.g., TCP session table, amongst others) and link state table information at predetermined time intervals over the Ethernet cross over or other communication link, regardless of a network failure.

FIG. 2 further shows a network failure between Sw1 and Sw3. For this reason, in embodiments, the switches on either side of the primary sensor 20 will stop sending BPDUs. This being the case, the primary sensor 20 will send its session table (e.g., TCP session table, amongst others) and its link state table to the back-up sensor 30, via the Ethernet cross over or other communication link.

Figure 3:
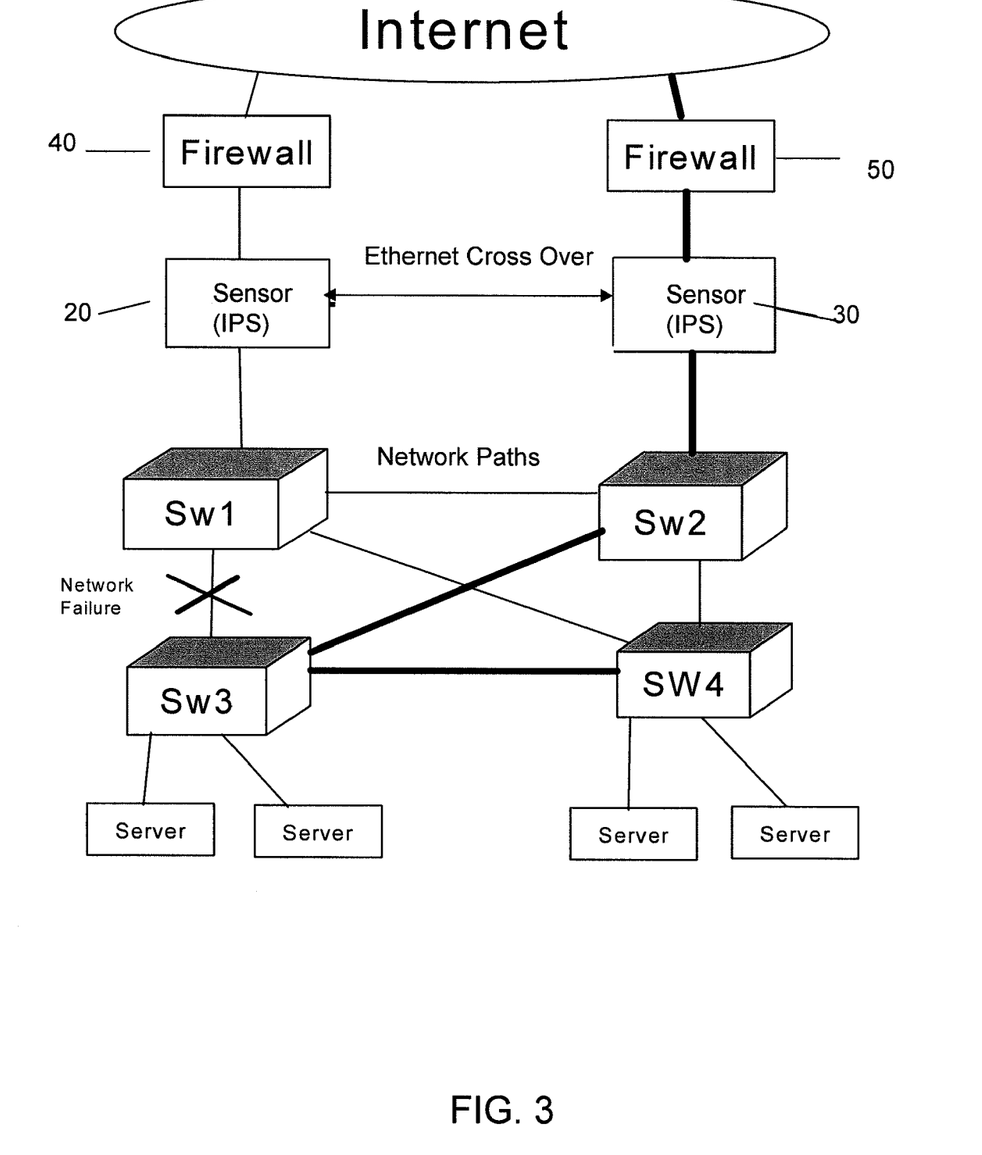
FIG. 3 illustratively shows a spanning tree reconverging in accordance with the invention.

FIG. 3 illustratively shows the spanning tree reconverging in accordance with the invention. In FIG. 3, a new network path has been established, in view of the network failure shown in FIG. 2. The newly established network path includes the following pathway: (i) Internet, (ii) firewall, (iii) back-up sensor (IPS) 30, (iv) Sw2, (v) Sw3 and (vi) Sw4 (or vice versa). By implementing the system and method of the invention, by the time the spanning tree reconverges, the back-up sensor 30 already has all of the current real time session information and can take over in-line network intrusion prevention without loosing any conversations.

It should be understood by those of skill in the art that the newly established network path shown in FIG. 3 is merely one illustrative example contemplated by the invention. For example, in embodiments, the network path could have been from (i) Internet, (ii) primary (IPS) 20, (iii) Sw1, (iv) Sw2 and (v) Sw4 (or vice versa), for example. Typically, though, the spanning tree will select the shortest path when reestablishing a connection. In any event, the primary sensor, on a predetermined time period, may send the current real time session information to the back-up sensor 30. By doing so, the back-up sensor 30 will have the necessary information to take over in-line network intrusion prevention and maintain the conversation, even though it may not be necessary to utilize the services of the back-up sensor 30.

In further embodiments, the primary 20 and back-up sensors 30 may be in either passive mode or active mode. In the passive mode, the primary sensor 20 and back-up sensors 30 will be in-line, waiting to detect the BPDUs. If no BPDUs are detected, then the session table (e.g., TCP session table, amongst others) and its link state table information can be sent to a back-up sensor 30, via the Ethernet cross over or other communication link. In the active mode, the primary 20 and back-up sensors 30 may manipulate the network path by assisting the spanning tree in reestablishing a new network path.

Exemplary Processes in Accordance with the Invention

Figure 4:
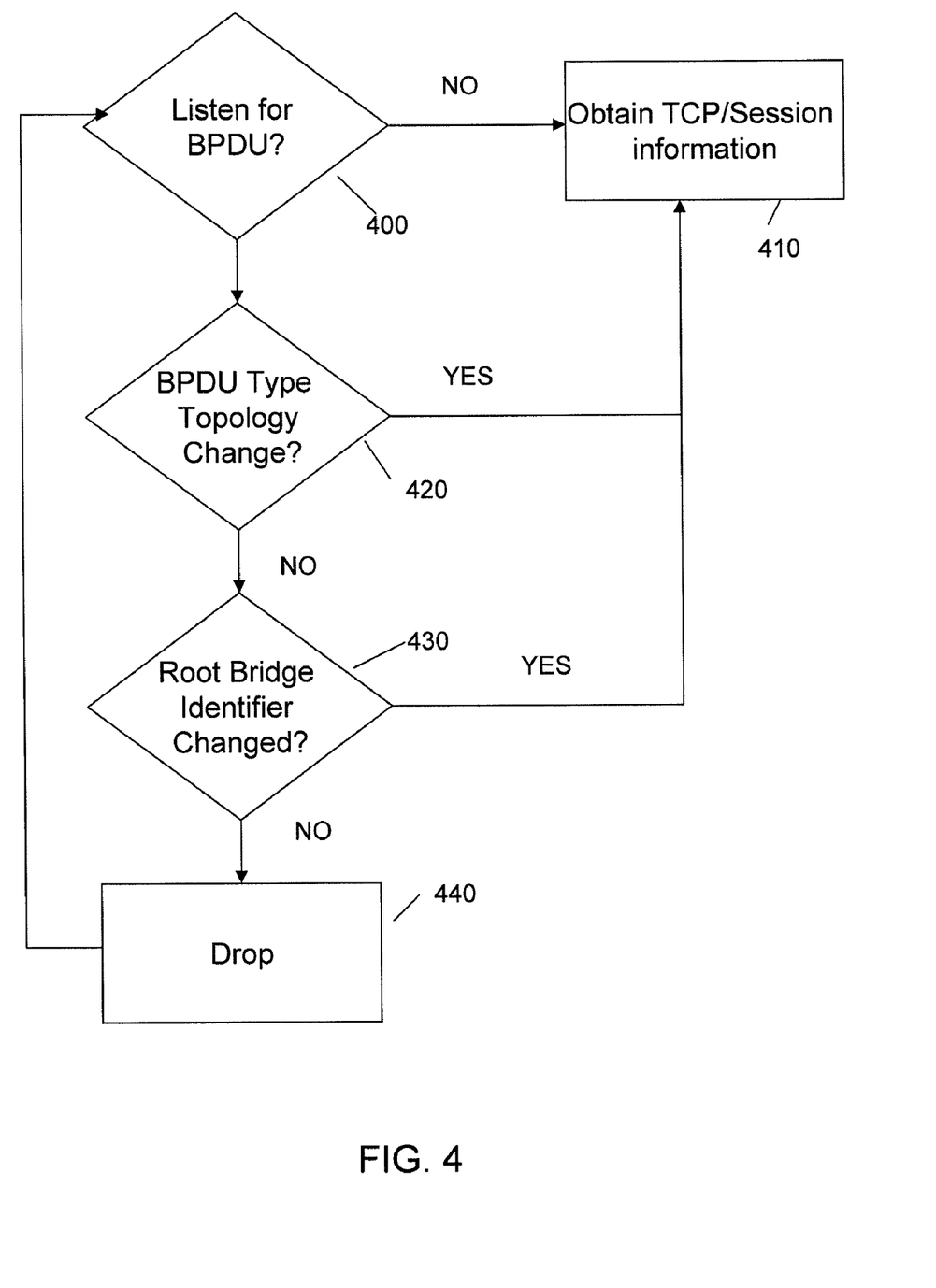
FIGS. 4 and 5 show flow charts implementing processes in accordance with aspects of the invention.
Figure 5:
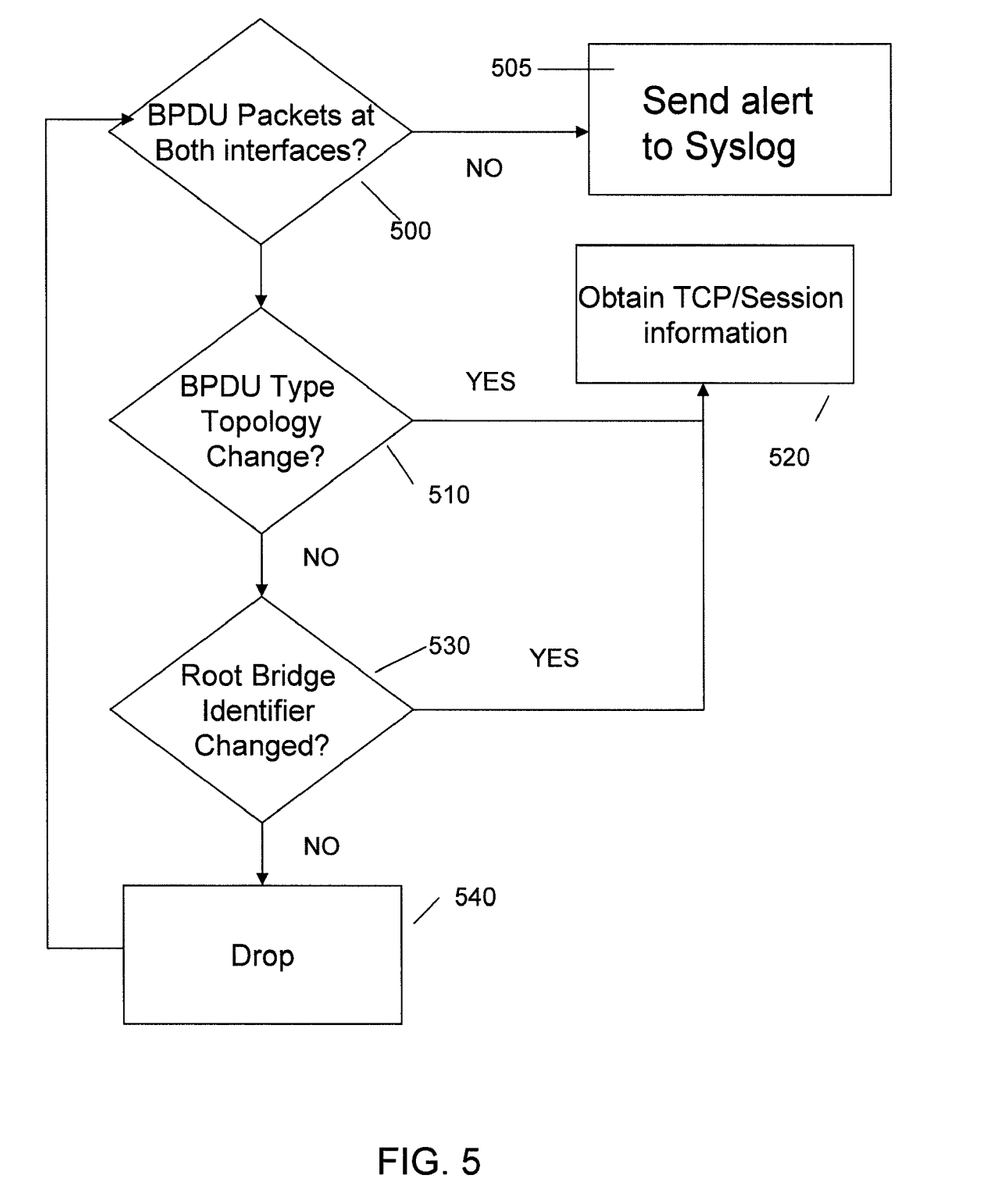

FIGS. 4 and 5 are flow diagrams showing processing steps of embodiments of the invention. FIGS. 4 and 5 may equally represent a high-level block diagram of components of the invention implementing the steps thereof. The steps of FIGS. 4 and 5 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

The invention can take the form of an entirely hardware embodiment or an embodiment containing both hardware and software elements (any of which is referred generally as "file management program"). The hardware and software elements include a computer infrastructure configured to implement the functionality of the present invention. The computer infrastructure may take the form, for example, of the environment of FIG. 1. The software elements may be firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, the program for use by or in connection with the instruction execution system, apparatus, or device. The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In embodiments, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement.

Referring to FIG. 4, at step 400, the primary sensor (or back-up sensor) listens for BPDUs. If a BPDU is not detected, the network has failed and the sensor will send the session table (e.g., TCP session table, amongst others) and its link state table information to the back-up sensor, via the Ethernet cross over or other communication link (or vice versa), at step 410. In embodiments, the sensors can play an active role in the spanning tree by assisting in the establishment of a new network path. As described above, the new network path may maintain the connection with the primary sensor, if this remains the shortest path, for example, or use the back-up sensor.

If the BPDU is detected, at step 420, the file management program will make a determination as to whether there is a BPDU type topology change. Such topology change is indicative of an establishment of a new network path due to, for example, a network failure. If there is a topology change, the file management program continues at step 410. If there is no topology change, the file management program will determine if there is a bridge identifier field change in the spanning tree, at step 430. Such a bridge identifier field change is indicative of an establishment of a new network path due to, for example, a network failure. If there is a bridge identifier field change, the file management program of the invention continues at step 410. If there is no bridge identifier field change, the process drops the BPDU at step 440 and reverts back to step 400.

Referring to FIG. 5, at step 500, a determination is made as to whether there are BPDU packets at both interfaces of the sensor (IPS). If there are not, then an alert is send to the Syslog at step 505. This may be indicative of "bad" network traffic, e.g., network failure. If there are packets at both interfaces, at step 510, the file management program will make a determination as to whether there is a BPDU type topology change. Such topology change is indicative of an establishment of a new network path due to, for example, a network failure. If there is a topology change, the file management program of the invention continues at step 520. At step 520, the sensor will send the session table (e.g., TCP session table, amongst others) and its link state table information to the back-up sensor, via the Ethernet cross over or other communication link (or vice versa).

If there is no topology change, the file management program will determine if there is a bridge identifier field change in the spanning tree, at step 530. Such a bridge identifier field change is indicative of an establishment of a new network path due to, for example, a network failure. If there is a bridge identifier field change, the process of the invention continues at step 520. If there is no bridge identifier field change, the file management program drops the BPDU at step 540 and reverts back to step 500.

Thus, as described with reference to FIGS. 4 and 5 (and shown schematically in FIGS. 2 and 3), a method comprises transferring connection and session information from a primary sensor to a back-up sensor in a respective network path of a network such that, upon failure of a first network path in-line with the primary sensor, the method establishes a new network path in-line with the back-up sensor while maintaining session information. The transferring of the connection and session information is performed prior to the establishing of the new network path in-line with the back-up sensor.

While the invention has been described in terms of embodiments, those skilled in the art will recognize that the invention can be practiced with modifications and in the spirit and scope of the appended claims.

What is claimed is:

1. A network computer system comprising a first intrusion prevention system (IPS) sensor node and back-up IPS sensor node, the first IPS sensor node and the back-up IPS sensor node being in line with respective network communication paths between a source device and a destination device, the first IPS sensor node and the at least one back-up IPS sensor node being programmed to share connection and session information via a communication link such that a session established in one of the network communication paths can be maintained in the other network communication path after a failure in the one network. communication path and reconvergence to the other network communication path.

2. The network computer system of claim 1, wherein the first IPS sensor node and the back-up IPS sensor node are programmed to share session table and link state table information with each other.

3. The network computer system of claim 1, wherein the first IPS sensor node and the back-up IPS sensor node are spanning tree aware.

4. The network computer system of claim 1, wherein the first IPS sensor node is programmed to detect a network failure, and in response, transfer the connection and session information to the back-up IPS sensor prior to establishment of the network communication path which includes the second IPS sensor node, to maintain in the network communication path of the second IPS sensor node a session established in the network communication path of the first IPS sensor node.

5. The network computer system of claim 1, wherein the first IPS sensor node is programmed to copy its connection and session information to the IPS sensor nodes prior to establishment of the network communication path of the second IPS sensor node.

6. A network computer system comprising a first intrusion protection system ("IPS") sensor and at a back-up IPS sensor, the first IPS sensor and the back-up IPS sensor being in line with respective network paths between a source device and a destination device, the first IPS sensor and the back-up IPS sensor being programmed to share connection and session information via a communication link, wherein the first IPS sensor and the back-up IPS sensors are programmed to transfer session table and link state table information at predetermined time intervals, regardless of a failure in the network paths.

7. The network computer system of claim 6, wherein the first IPS sensor is programmed to monitor network connections and sessions, and transfer the information identifying the connections and sessions to the second IP sensor prior to establishment of the network path which includes the second IPS sensor, to maintain in the network: path of the second IPS sensor a session established in the network path of the first IP sensor.

8. A network computer system comprising a first intrusion protection system ("IPS") sensor and a back-up IPS sensor, the first IPS sensor and the back-up IPS sensor being in line with first and second respective network paths between a source device and a destination device, the first IPS sensor and the back-up IPS sensor being programmed to share connection and session information via a communication link, wherein the back-up IPS sensor is programmed to detect that a connection path from the source device to the destination device is shifting and request the connection and session information from the first IPS sensor such that the connection and session information is received by the back-up IPS sensors prior to convergence to the second network path.

9. A network computer system, comprising:
 a first intrusion protection system ("IPS") sensor in a first network path from a source device to a destination device, the first network path including a plurality of switches; and
 a second IPS sensor in a second network path from the source device to the destination device, the second network path including a plurality of switches, the second network path being a back-up to the first network path, the second IPS sensor being a back-up sensor to the first IPS sensor; and
 wherein the first IPS sensor is programmed to transfer connection and session information to the second IPS sensor over a communication link to maintain in the second network path a user session, established in the first network path, if there is a failure in the first network path, wherein the first IPS sensor is programmed to transfer the connection and session information to the second IPS sensor at predetermined time intervals, regardless of a failure in the first network path.

10. A network computer system, comprising:
 a first intrusion protection system ("IPS") sensor in a first network path, from a source device to a destination device, the first network path including a plurality of switches; and
 a second IPS sensor in a second network, path, from the source device to the destination device the second network path including a plurality switches, the second IPS sensor being a back-up to the first IPS sensor; and
 wherein the first IPS sensor is programmed to transfer connection and session information to the second IPS sensor over a communication link to maintain in the second network path a session established in the first network path if there is a failure in the first network path, and
 the first IPS sensor is programmed to monitor network connections and transfer the connection and session information to the second IPS sensor during convergence from the first network path to the second network path in response to detection of a failure in the first network path.

11. A method for maintaining an active session between a source device and a destination device wherein the active session is established while the source device and the destination device communicate via a first network communication path which includes a first intrusion protection system ("IPS") sensor node to block malicious communications, the first network communication path subsequently fails and communication between the source device and the destination device converges to a second network communication path including a second IPS sensor node to block malicious communications, the method comprising the steps of:
 the first IPS sensor node detecting the failure of the first network communication path, and in response, transferring connection and session information of the session to the second IPS sensor node establishment of the second network communication path, the communication between the source device and the destination device continues via the second network communication path with the session established in the first network communication path.

12. A method for maintaining an active session between a source device and a destination device, wherein the active session is established while the source device and the destination device communicate via a first network path which includes a primary intrusion protection system ("IPS") sensor node to block malicious communications, the method comprising the steps of:
 in response to detection of a bridge identifier field change or a network type topology change affecting the first network path, the primary IPS sensor node transferring connection and session information to a back-up IPS sensor in a second network path.

13. A computer program product for maintaining an active connection and session, established in a first network communication path between a source device and a destination device, after convergence to a second network communication path between the source device and the destination device, a spanning tree algorithm program determining and directing utilization of the first network communication path for the connection from the source device to the destination device before the convergence, subsequently detecting a failure in the first network communication path, and in response, directing the convergence from the first network communication path to the second network communication path, the computer program product comprising:
 a first computer readable storage media;
 a first intrusion protection system ("IPS") program, stored on the first computer readable storage media, for execution in a first IPS sensor node in the first network communication path to block malicious messages in the first network communication path and record the active connection and session between the source device and the destination device via the first network communication path;
 a second computer readable storage media;
 a second IPS program, stored on the second computer readable storage media, for execution in a second IPS sensor node in the second network communication path to block malicious messages in the second network communication path and maintain the active connection and session after receipt of the record of the active connection and session; and wherein the first IPS program is programmed to send the record of the active connection and session to the second IPS program during the convergence from the first network communication path to the second network communication path, so the second IPS program can maintain the active connection and session, in the second network communication path, between the source device and the destination device after convergence from the first network communication path to the second network communication path.

14. The computer program product of claim 13 wherein other nodes in the first network communication path, while functional, repeatedly broadcast bridge protocol data unit ("BPDU") frames; and the first IPS sensor node includes programming to detect the BPDU frames, and in response to absence of detected BPDU frames from one or more of such other nodes, determine that the first network communication path has failed and in response, initiate the sending of the record of the active connection and session to the second IPS program.

15. The computer program product of claim 13 wherein other nodes in the first network communication path, while functional, repeatedly send bridge protocol data unit ("BPDU") frames, and the spanning tree algorithm program includes programming to detect the BPDU frames, and in response to absence of detected BPDU frames from one or more of such other nodes, determine that the first network communication path has failed and in response, direct convergence from the first network communication path to the second network communication path; and the first IPS sensor node includes programming to detect the BPDU frames, and in response to absence of detected BPDU frames from one or more of such other nodes, determine that the first network communication path has failed and in response, initiate the sending of the record of the active connection and session to the second IPS program.

16. The computer program product of claim 13 wherein the first and second network communication paths include first and second respective firewalls in first and second respective computing devices different than the first and second respective IPS sensor nodes.

17. A computer system for maintaining an active connection and session, established in a first network communication path, between a source device and a destination device, after convergence to a second network communication path between the source device and the destination device, a spanning tree algorithm program determining and directing utilization of the first network communication path for the connection from the source device to the destination device before the convergence, subsequently detecting a failure in the first network communication path, and in response, directing the convergence from the first network communication path to the second network communication path, the computer system comprising:

a first CPU, a first computer readable memory and a first computer readable storage media in a first intrusion protection system ("IPS") sensor node in the first network communication path;

a first "IPS" program, stored on the first computer readable storage media for execution by the first CPU via the first computer readable memory in the first IPS sensor node, to block malicious messages in the first network communication path and record the active connection and session between the source device and the destination device via the first network communication path;

a second CPU, a second computer readable memory and a second computer readable storage media in a second IPS sensor node in the second network communication path;

a second IPS program, stored on the second computer readable storage media for execution by the second CPU via the second computer readable memory in the second IPS sensor node, to block malicious messages in the second network communication path and maintain the active connection and session after receipt of the record of the active connection and session; and wherein the first IPS program is programmed to send the record of the active connection and session to the second IPS program during the convergence from the first network communication path to the second network communication path, so the second IPS program can maintain the active connection and session, in the second network communication path, between the source device and the destination device after convergence from the first network communication path to the second network communication path.

18. The computer system of claim 17 wherein other nodes in the first network communication path, while functional, repeatedly broadcast bridge protocol data unit ("BPDU") frames; and the first IPS sensor node includes programming, stored on the first computer readable storage media for execution by the first CPU via the first computer readable memory, to detect the BPDU frames, and in response to absence of detected BPDU frames from one or more of such other nodes, determine that the first network communication path has failed, and in response, initiate the sending of the record of the active connection and session to the second IPS program.

19. The computer system of claim 17 wherein other nodes in the first network communication path, while functional, repeatedly send bridge protocol data unit ("BPDU") frames, and the spanning tree algorithm program includes programming to detect the BPDU frames, and in response to absence of detected BPDU frames from one or more of such other nodes, determine that the first network communication path has failed and in response, direct convergence from the first network communication path to the second network communication path; and the first IPS sensor node includes programming, stored on the first computer readable storage media for execution by the first CPU via the first computer readable memory, to detect the BPDU frames, and in response to absence of detected BPDU frames from one or more of such other nodes, determine that the first network communication path has failed and in response, initiate the sending of the record of the active connection and session to the second IPS program.

20. The computer system of claim 17 wherein the first and second network communication paths include first and second respective firewalls in first and second respective computing devices different than the first and second respective IPS sensor nodes.

21. The network computer system of claim 1 wherein the respective network communication paths include respective firewalls in different computing devices than the respective IPS sensor nodes.

22. The computer program product of claim 1 wherein other nodes in the first network communication path, while functional, repeatedly broadcast bridge protocol data unit ("BPDU") frames; and the first IPS sensor node includes programming to detect the BPDU frames, and in response to absence of detected BPDU frames from one or more of such other nodes, determine that the first network communication path has failed and in response, initiate the sharing of the connection and session information with the second IPS sensor node.

* * * * *